(12) United States Patent
Moriarty et al.

(10) Patent No.: US 11,921,896 B2
(45) Date of Patent: Mar. 5, 2024

(54) SYSTEMS AND METHODS FOR ANONYMIZING A DATASET OF BIOMETRIC DATA WHILE RETAINING DATA UTILITY

(71) Applicant: JPMORGAN CHASE BANK, N.A., New York, NY (US)

(72) Inventors: Bill Moriarty, West Chester, PA (US); Shaohan Hu, Yorktown Heights, NY (US); Marco Pistoia, Amawalk, NY (US); Hargun Kalsi, Monmouth Junction, NJ (US); Sean Moran, Putney (GB); Brett Sanford, Tunbridge Wells (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 277 days.

(21) Appl. No.: 17/538,763

(22) Filed: Nov. 30, 2021

(65) Prior Publication Data

US 2022/0198061 A1 Jun. 23, 2022

Related U.S. Application Data (60) Provisional application No. 63/138,951, filed on Jan. 19, 2021, provisional application No. 63/126,935, filed on Dec. 17, 2020.

(51) Int. Cl.
*G06F 21/62* (2013.01)
*G06F 16/23* (2019.01)

(52) U.S. Cl.
CPC ...... *G06F 21/6254* (2013.01); *G06F 16/2379* (2019.01)

(58) Field of Classification Search
CPC .............. G06F 21/6245; G06F 16/2379
USPC .................................................. 726/26
See application file for complete search history.

(56) References Cited

U.S. PATENT DOCUMENTS

2021/0319134 A1* 10/2021 Kåberg Johard .. G06Q 30/0242

OTHER PUBLICATIONS

International Search Report, dated Mar. 11, 2022, from corresponding International Application No. PCT/US2021/072659.

(Continued)

*Primary Examiner* — Michael S McNally
(74) *Attorney, Agent, or Firm* — GREENBERG TRAURIG LLP (57) ABSTRACT

A global partitioning-based method for anonymizing a dataset of biometric data may include an anonymization computer program: (1) receiving a value k representing a number of records to hide a biometric datum among, a value t that represents a t-closeness parameter for a t-close distribution, a weight parameter, and a first number of features to retain for determining an attribute of interest; (2) receiving the attribute of interest; (3) calculating a distribution of the attribute of interest in a biometric dataset; (4) splitting the biometric dataset into a plurality of k-sized clusters that satisfy the t-close distribution; (5) anonymizing each biometric datum in the plurality of k-sized clusters using a weighted average of landmarks for the biometric datums in k-sized clusters using the weight parameter; (6) adding each anonymized biometric datum into an anonymized biometric dataset; and (7) persisting the anonymized biometric dataset.

20 Claims, 4 Drawing Sheets

(56) References Cited

OTHER PUBLICATIONS

Written Opinion of the International Searching Authority, dated Mar. 11, 2022, from corresponding International Application No. PCT/US2021/072659.
Sim, Terence; et al.: "Controllable Face Privacy", 2015 11th IEEE International Conference and Workshops on Automatic Face and Gesture Recognition (FG), IEEE, vol. 4, May 4, 2015, pp. 1-8, XP033221593, DOI: 10.1109/FG.2015.7285015.
Ninghui, Li; et al.: "t-Closeness: Privacy Beyond k-Anonymity and I-Diversity", Data Engineering, 2007. IEEE 23rd International Conference on, IEEE, PI, Apr. 1, 2007, pp. 106-115, XP031095754.

* cited by examiner

SYSTEMS AND METHODS FOR ANONYMIZING A DATASET OF BIOMETRIC DATA WHILE RETAINING DATA UTILITY

RELATED APPLICATIONS

This application claims priority to, and the benefit of, U.S. Provisional Patent Application Ser. No. 63/126,935, filed Dec. 17, 2020 and U.S. Provisional Patent Application Ser. No. 63/138,951, filed Jan. 19, 2021, the disclosure of each of which are hereby incorporated, by reference, in their entireties.

BACKGROUND OF THE INVENTION

1. Field of the Invention

Embodiments are generally related to systems and methods for anonymizing a dataset of biometric data while retaining data utility.

2. Description of the Related Art

K-anonymity is a popular method for enforcing anonymity of personal data in databases. Methods for k-anonymity anonymize the data so that it is not possible to distinguish one person from K−1 people based on their database records. It is commonly known as the "hiding in the crowd guarantee."

SUMMARY OF THE INVENTION

Systems and methods for anonymizing a dataset of biometric data while retaining data utility are disclosed. In one embodiment, a global partitioning-based method for anonymizing a dataset of biometric data may include: (1) receiving, by an anonymization computer program, a value k representing a number of records to hide a biometric datum among, a value t that represents a t-closeness parameter for a t-close distribution, a weight parameter, and a first number of features to retain for determining an attribute of interest; (2) receiving, by the anonymization computer program, the attribute of interest; (3) calculating, by the anonymization computer program, a distribution of the attribute of interest in a biometric dataset; (4) splitting, by the anonymization computer program, the biometric dataset into a plurality of k-sized clusters that satisfy the t-close distribution; (5) anonymizing, by the anonymization computer program, each biometric datum in the plurality of k-sized clusters using a weighted average of landmarks for the biometric datums in k-sized clusters using the weight parameter; (6) adding, by the anonymization computer program, each anonymized biometric datum into an anonymized biometric dataset; and (7) persisting, by the anonymization computer program, the anonymized biometric dataset.

In one embodiment, nodes in the biometric datums may represent landmark biometrics, and edges in the biometric datums may represent distances between the landmark biometrics.

In one embodiment, the method may further include applying, by the anonymization computer program, a first machine learning model to identify the first number of features that have a large influence on detecting the attribute of interest.

In one embodiment, the first machine learning model may include a multi-class linear regression model.

In one embodiment, the first number of features may be weighted with the weight parameter.

In one embodiment, the anonymization computer program may further receive a second number of features to retain for determining an additional attribute of interest.

In one embodiment, the method may further include applying, by the anonymization computer program, a second machine learning model to identify the second number of features that have a large influence on detecting the additional attribute of interest.

According to another embodiment, a random sampling-based method for anonymizing a dataset of biometric data may include: (1) receiving, by an anonymization computer program, a value k representing a number of records to hide a biometric datum among, a value t that represents a t-closeness parameter for a t-close distribution, a weight parameter, and a first number of features to retain for determining an attribute of interest; (2) receiving, by the anonymization computer program, the attribute of interest; (3) calculating, by the anonymization computer program, a distribution of the attribute of interest in a biometric dataset; (4) iterating, by the anonymization computer program, through each biometric datum in the biometric dataset to create a k-sized biometric cluster by: (a) selecting, by the anonymization computer program, a biometric datum from the biometric dataset; (b) retrieving, by the anonymization computer program, k−1 biometric datums from the biometric dataset to create a k-sized cluster of the selected biometric datum and the k−1 biometric datums such that the k-sized cluster satisfies the t-closeness distribution; (c) anonymizing, by the anonymization computer program, the selected biometric datum using a weighted average of landmarks for the biometric datums in the k-sized clusters using the weight parameter; (d) adding, by the anonymization computer program, the anonymized selected biometric datum into an anonymized biometric dataset; and (e) releasing, by the anonymization computer program, the k−1 biometric datums to the biometric dataset; and (5) persisting, by anonymization computer program, the anonymized biometric dataset.

In one embodiment, nodes in the biometric datums may represent landmark biometrics, and edges in the biometric datums may represent distances between the landmark biometrics.

In one embodiment, the method may further include applying, by the anonymization computer program, a first machine learning model to identify the first number of features that have a large influence on detecting the attribute of interest.

In one embodiment, the first machine learning model may include a multi-class linear regression model.

In one embodiment, the first number of features may be weighted with the weight parameter.

In one embodiment, the anonymization computer program may further receive a second number of features to retain for determining an additional attribute of interest.

In one embodiment, the method may further include applying, by the anonymization computer program, a second machine learning model to identify the second number of features that have a large influence on detecting the additional attribute of interest.

According to another embodiment, a system may include a database storing a biometric dataset of biometric datums; a user interface that receives a value k representing a number of records to hide a biometric datum among, a value t that represents a t-closeness parameter for a t-close distribution, a weight parameter, a first number of features to retain for determining an attribute of interest, and the attribute of interest; and an electronic device comprising a computer processor and a memory storing an anonymization computer program that receives the value k, the value t, the value w, the value n1, and the attribute of interest, calculates a distribution of the attribute of interest in the biometric dataset, splits the biometric dataset into a plurality of k-sized clusters that satisfy the t-close distribution, anonymizes each biometric datum in the plurality of k-sized clusters using a weighted average of landmarks for the biometric datums in k-sized clusters using the weight parameter, adds each anonymized biometric datum into an anonymized biometric dataset, and persists the anonymized biometric dataset.

In one embodiment, nodes the biometric datums may represent landmark biometrics, and edges in the biometric datums may represent distances between the landmark biometrics.

In one embodiment, the anonymization computer program may apply a first machine learning model to identify the first number of features that have a large influence on detecting the attribute of interest.

In one embodiment, the first number of features may be weighted with the weight parameter.

In one embodiment, the anonymization computer program may further receive a second number of features to retain for determining an additional attribute of interest.

In one embodiment, the anonymization computer program may apply a second machine learning model to identify the second number of features that have a large influence on detecting the additional attribute of interest.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for anonymizing a dataset of biometric data while retaining data utility. The biometric data may be anonymized such that it is not possible to distinguish one person from other people based on the biometric data.

Previous methods for k-anonymity are designed for traditional data stored in, for example, relational database tables, such as text (e.g., name, address, postcode, disease, etc.). There are very few methods that explicitly enforce k-anonymity for biometric data, such as facial, fingerprint, movement data, etc.

Embodiments are directed to novel k-anonymity and t-closeness algorithms that represents biometric data as a feature vector, such as a graph-based data structure, and anonymizes at the level of the abstract graph representation while maintaining a diverse representation of an attribute of interest (e.g., an emotion) in the anonymized graph representations. In addition, while achieving anonymity and diversity, embodiments maintain data utility, which may be defined by application to a downstream task. For example, the biometric data may be facial landmarks detected on a face (e.g., the eyes, mouth, nose, facial boundary, etc.). A feature vector (e.g., a fully connected graph) may be constructed by representing points in these landmark regions as nodes with edges connecting all points. In this context, k-anonymity may be enforced by making the feature vectors of k people with varied emotions as similar to each other as possible, while dissimilar from other graphs.

The anonymous representations are still useful for a pre-defined downstream task. Such a task could be emotion detection where we want to infer the emotion of a person based on their biometric graph, but without being able to infer the person's identity.

In embodiments, a machine learning task may be performed on the database to detect an "attribute of interest," such as sentiment, and keep track of important features to the machine learning detection. The database may be anonymized de-identified while retaining the ability to detect the attribute of interest with reasonable accuracy by computing a weighted average for each graph.

In embodiments, the distribution of the attribute of interest among the entire dataset may be calculated, and a subset of the dataset that accurately represents this distribution is said to be "t-close." In general, an equivalence class is said to have t-closeness if the distance between the distribution of a sensitive attribute in this class and the distribution of the attribute in the whole table is no more than a threshold t.

Figure 1:
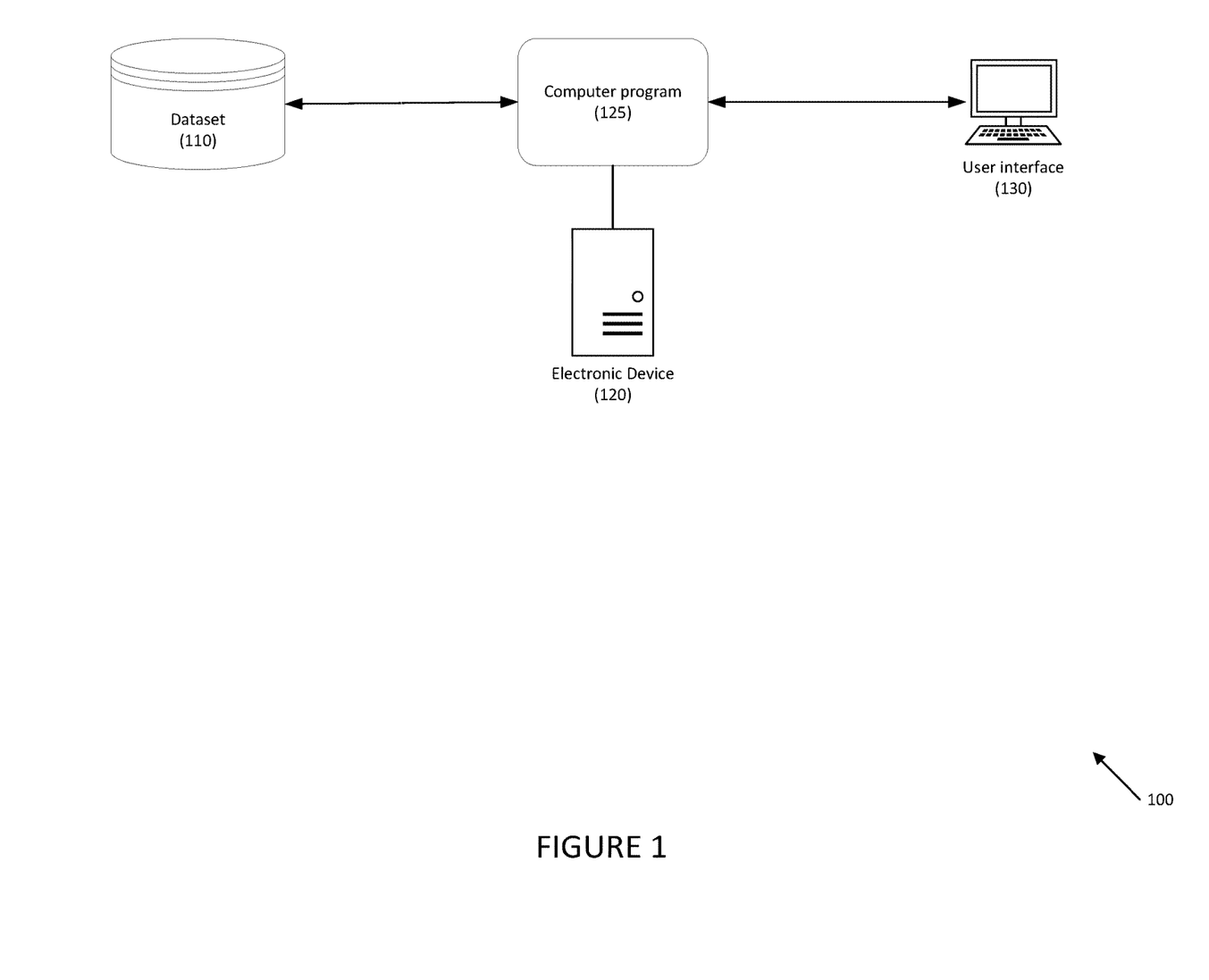
FIG. 1 is a depicts a system for anonymizing a dataset of biometric data while retaining data utility according to an embodiment.

Referring to FIG. 1, a system for anonymizing a dataset of biometric data while retaining data utility is disclosed according to an embodiment. System 100 may include dataset 110, which may store biometric data. Although embodiments may be described in the context of facial biometric data, it should be recognized that any suitable biometric, such as fingerprints, voiceprints, palm scans, vein scans, etc. may be used as is necessary and/or desired.

System 100 may further include electronic device 120, which may be any suitable electronic device, including servers (e.g., physical and/or cloud based), computers (e.g., workstations, desktops, laptops, notebooks, tablets, etc.), etc. Electronic device 120 may execute anonymization computer program 125 that may de-identify or anonymize the biometric data in dataset 110 while maintaining the utility of the underlying data, such as to identify an attribute of interest.

In one embodiment, each biometric datum (e.g., a facial biometric) in the dataset may be classified with regard to one or more attribute of interest. For example, a facial biometric may be classified for an emotion (e.g., happy, sad, surprised, neutral, etc.). The classification may be written or associated with each biometric datum, written to a separate file, etc.

System 100 may further include user interface 130, which may be provided by any suitable electronic device. In one embodiment, a user may provide certain parameters (e.g., k (the number of records to hide a target, such as a biometric datum, among), t (the t-closeness parameter), w (the weight parameter for computing the weighted event), $n_1$ (a first number of features to retain for the attribute of interest), and optionally $n_2$ (a second number of features to retain for additional attributes).

Figure 2:
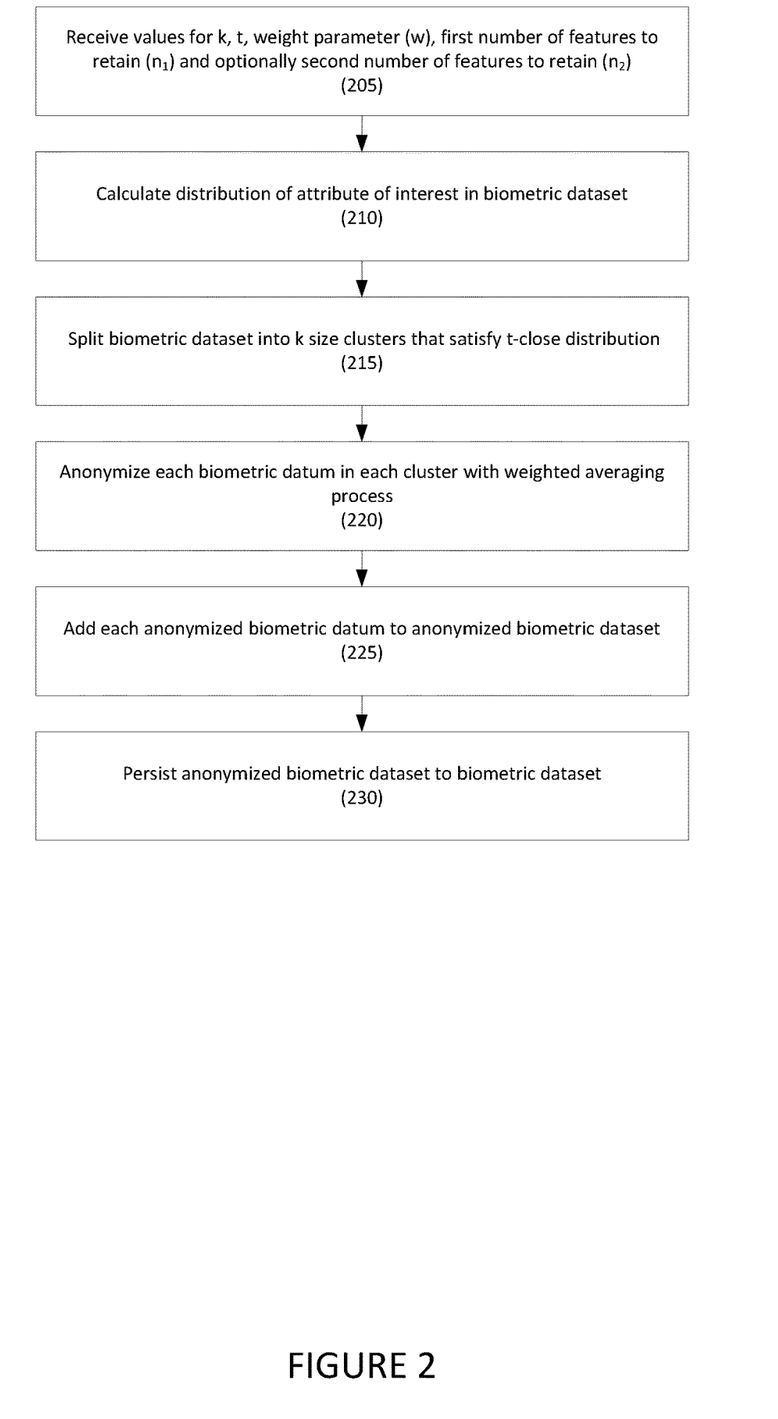
FIG. 2 depicts a global partitioning-based method for anonymizing a dataset of biometric data while retaining data utility according to an embodiment.

Referring to FIG. 2, a global partitioning-based method for anonymizing a dataset of biometric data while retaining data utility is disclosed according to an embodiment.

In step 205, values for k (the number of records to hide a target, such as a biometric datum, among), t (the t-closeness parameter), w (the weight parameter for computing the weighted event), $n_1$ (the first number of features to retain for the attribute of interest), and optionally $n_2$ (the second number of features to retain for additional attributes that may be used for additional machine learning tasks) are received. In one embodiment, some or all of these values may be received from a user via a user interface.

In step 210, an attribute of interest may be received and an anonymization computer program may calculate the distribution of the attribute of interest in the biometric dataset. For example, if the attribute of interest is a happy emotion, a computer program may determine the distribution of the happy emotion in the biometric dataset.

In step 215, the anonymization computer program may split the biometric dataset into k-sized clusters that satisfy the t-close distribution. Thus, each k-sized cluster has biometric datums that proportionally represents the distribution of the attribute of interest.

In step 220, the anonymization computer program may anonymize each biometric datum in each cluster using a weighted average of landmarks for the biometric datums in the t-close cluster. For example, all corresponding values are averaged among the cluster, and the features that are identified as to retain (i.e., $n_1$ and optionally $n_2$) are weighted during this process to somewhat affix them in place. For example, nodes in the biometric datum may represent landmark biometrics, and edges may be annotated with distances between each landmark. Machine learning, such as a multi-class linear regression model, may be used to identify the features, such as edges, that have a large influence on determining or detecting the attribute of interest. For example, the identified features may be more deterministic than others in detecting the object of interest. These edges may be weighted on the biometric datum using the value w.

In step 225, the anonymization computer program may add each anonymized biometric datum to an anonymized biometric dataset.

In step 230, the anonymization computer program may persist or store the anonymized biometric dataset into the biometric dataset, or may store the anonymized biometric dataset as a separate dataset, etc.

Figure 3:
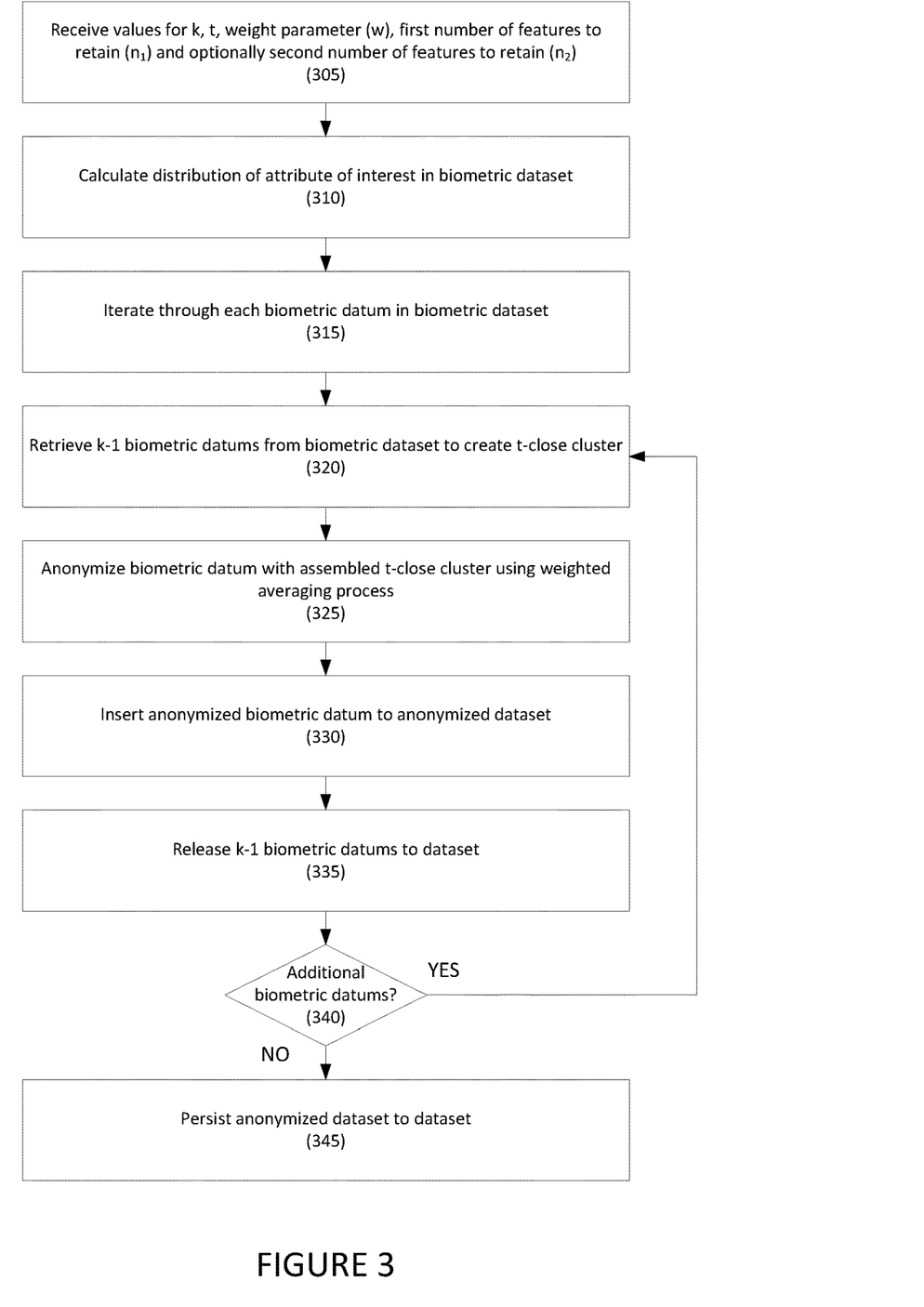
FIG. 3 depicts a random sampling-based method for anonymizing a dataset of biometric data while retaining data utility according to an embodiment.

Referring to FIG. 3, a method for a random sampling-based method for anonymizing a dataset of biometric data while retaining data utility is disclosed according to an embodiment.

In step 305, values for k (the number of records to hide a target, such as a biometric datum, among), t (the t-closeness parameter), w (the weight parameter for computing the weighted event), $n_1$ (the first number of features to retain for the attribute of interest), and optionally $n_2$ (the second number of features to retain for additional attributes that may be used for additional machine learning tasks) are received. This may be similar to step 205, above.

In step 310, an attribute of interest may be received and the distribution of the attribute of interest in the biometric dataset may calculated. This may be similar to step 210, above.

In step 315, the anonymization computer program may iterate through each biometric datum in the biometric dataset, and in step 320, may retrieve k–1 biometric datums from the biometric dataset to create a k-sized cluster that satisfies the t-closeness. Thus, each k-sized cluster has biometric datums that proportionally represents the distribution of the attribute of interest.

In step 325, the anonymization computer program may anonymize the biometric datum using a weighted average of landmarks for the biometric datums in the t-close cluster. This may be similar to step 220, above.

In step 330, the anonymization computer program may add the anonymized biometric datum to an anonymized biometric dataset. This may be similar to step 225, above.

In step 335, the anonymization computer program may release the k–1 graphs to the biometric dataset.

If, in step 340, there are additional biometric datums to anonymize, the process may loop back to step 320.

If there are no additional biometric datums, in step 345, the anonymization computer program may persist the anonymized dataset. This may be similar to step 230, above.

Figure 4:
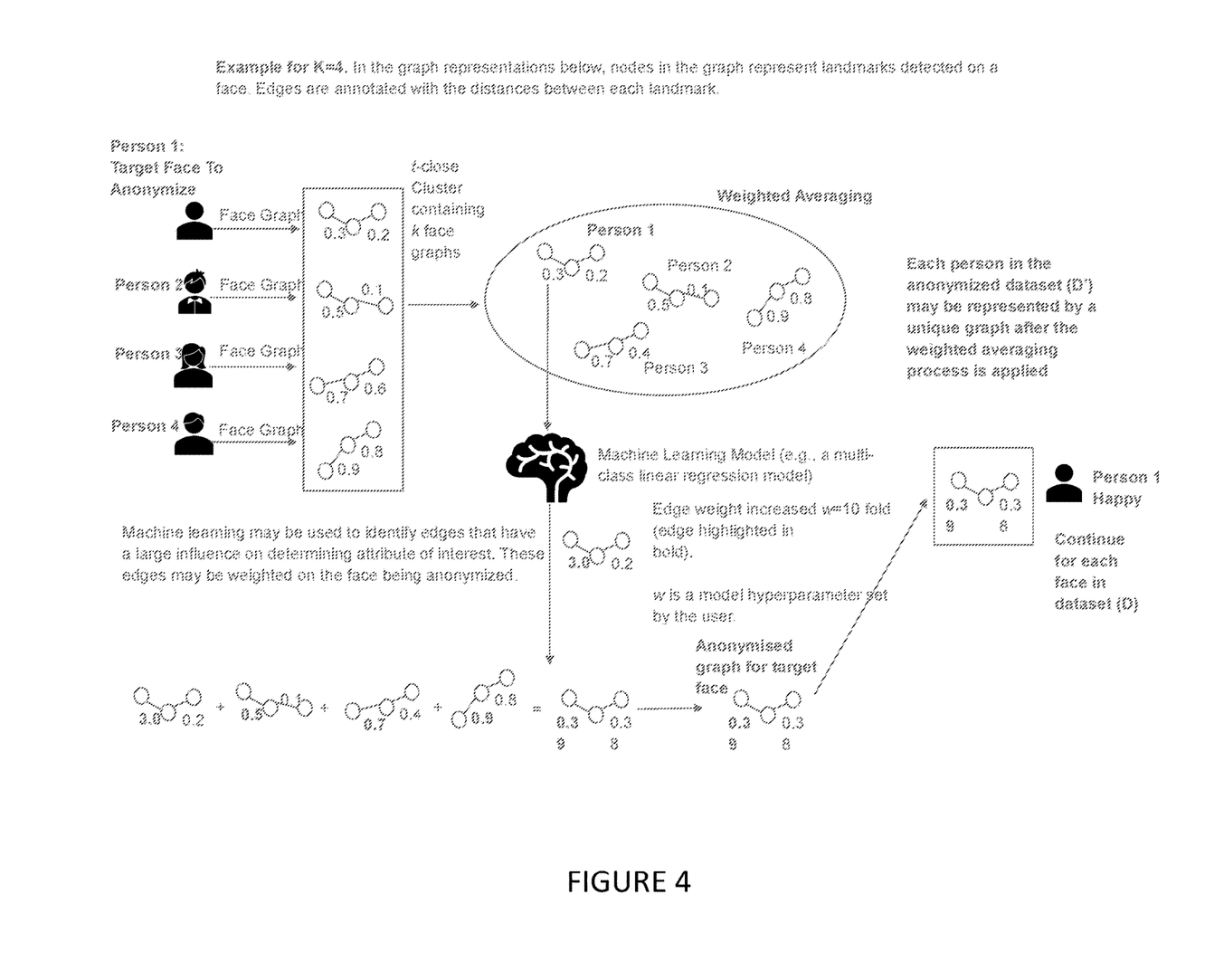
FIG. 4 depicts an example of anonymizing a dataset of biometric data while retaining data utility according to an embodiment.

FIG. 4 depicts an example of anonymizing a dataset of biometric data while retaining data utility according to an embodiment. In FIG. 4, D represents the biometric dataset, and D' represents the anonymized biometric dataset.

Although embodiments may be described in the context of facial biometrics, and identifying emotions from the facial biometrics, it should be recognized that embodiments are not so limited. Other biometrics and attributes may be used and identified as is necessary and/or desired.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A global partitioning-based method for anonymizing a dataset of biometric data, comprising:
    receiving, by an anonymization computer program, a value k representing a number of records to hide a biometric datum among, a value t that represents a t-closeness parameter for a t-close distribution, a weight parameter, and a first number of features to retain for determining an attribute of interest;
    receiving, by the anonymization computer program, the attribute of interest;
    calculating, by the anonymization computer program, a distribution of the attribute of interest in a biometric dataset;
    splitting, by the anonymization computer program, the biometric dataset into a plurality of k-sized clusters that satisfy the t-close distribution;
    anonymizing, by the anonymization computer program, each biometric datum in the plurality of k-sized clusters using a weighted average of landmarks for the biometric datums in k-sized clusters using the weight parameter;
    adding, by the anonymization computer program, each anonymized biometric datum into an anonymized biometric dataset; and
    persisting, by the anonymization computer program, the anonymized biometric dataset.

2. The method of claim 1, wherein nodes in the biometric datums represent landmark biometrics, and edges in the biometric datums represent distances between the landmark biometrics.

3. The method of claim 1, further comprising:
    applying, by the anonymization computer program, a first machine learning model to identify the first number of features that have a large influence on detecting the attribute of interest.

4. The method of claim 3, wherein the first machine learning model comprises a multi-class linear regression model.

5. The method of claim 3, wherein the first number of features are weighted with the weight parameter.

6. The method of claim 1, wherein the anonymization computer program further receives a second number of features to retain for determining an additional attribute of interest.

7. The method of claim 6, further comprising:
    applying, by the anonymization computer program, a second machine learning model to identify the second number of features that have a large influence on detecting the additional attribute of interest.

8. A random sampling-based method for anonymizing a dataset of biometric data, comprising:
    receiving, by an anonymization computer program, a value k representing a number of records to hide a biometric datum among, a value t that represents a t-closeness parameter for a t-close distribution, a weight parameter, and a first number of features to retain for determining an attribute of interest;
    receiving, by the anonymization computer program, the attribute of interest;
    calculating, by the anonymization computer program, a distribution of the attribute of interest in a biometric dataset;
    iterating, by the anonymization computer program, through each biometric datum in the biometric dataset to create a k-sized biometric cluster by:
        selecting, by the anonymization computer program, a biometric datum from the biometric dataset;
        retrieving, by the anonymization computer program, k−1 biometric datums from the biometric dataset to create a k-sized cluster of the selected biometric datum and the k−1 biometric datums such that the k-sized cluster satisfies the t-closeness distribution;
        anonymizing, by the anonymization computer program, the selected biometric datum using a weighted average of landmarks for the biometric datums in the k-sized clusters using the weight parameter;
        adding, by the anonymization computer program, the anonymized selected biometric datum into an anonymized biometric dataset; and
        releasing, by the anonymization computer program, the k−1 biometric datums to the biometric dataset; and
    persisting, by anonymization computer program, the anonymized biometric dataset.

9. The method of claim 8, wherein nodes in the biometric datums represent landmark biometrics, and edges in the biometric datums represent distances between the landmark biometrics.

10. The method of claim 9, further comprising:
    applying, by the anonymization computer program, a first machine learning model to identify the first number of features that have a large influence on detecting the attribute of interest.

11. The method of claim 10, wherein the first machine learning model comprises a multi-class linear regression model.

12. The method of claim 10, wherein the first number of features are weighted with the weight parameter.

13. The method of claim 8, wherein the anonymization computer program further receives a second number of features to retain for determining an additional attribute of interest.

14. The method of claim 13, further comprising:
applying, by the anonymization computer program, a second machine learning model to identify the second number of features that have a large influence on detecting the additional attribute of interest.

15. A system, comprising:
a database storing a biometric dataset of biometric datums;
a user interface that receives a value k representing a number of records to hide a biometric datum among, a value t that represents a t-closeness parameter for a t-close distribution, a weight parameter, a first number of features to retain for determining an attribute of interest, and the attribute of interest; and
an electronic device comprising a computer processor and a memory storing an anonymization computer program that receives the value k, the value t, the value w, the value $n_1$, and the attribute of interest, calculates a distribution of the attribute of interest in the biometric dataset, splits the biometric dataset into a plurality of k-sized clusters that satisfy the t-close distribution, anonymizes each biometric datum in the plurality of k-sized clusters using a weighted average of landmarks for the biometric datums in k-sized clusters using the weight parameter, adds each anonymized biometric datum into an anonymized biometric dataset, and persists the anonymized biometric dataset.

16. The system of claim 15, wherein nodes the biometric datums represent landmark biometrics, and edges in the biometric datums represent distances between the landmark biometrics.

17. The system of claim 15, wherein the anonymization computer program applies a first machine learning model to identify the first number of features that have a large influence on detecting the attribute of interest.

18. The system of claim 17, wherein the first number of features are weighted with the weight parameter.

19. The system of claim 15, wherein the anonymization computer program further receives a second number of features to retain for determining an additional attribute of interest.

20. The system of claim 19, wherein the anonymization computer program applies a second machine learning model to identify the second number of features that have a large influence on detecting the additional attribute of interest.

* * * * *